(12) United States Patent
Schuetz et al.

(10) Patent No.: US 12,005,394 B2
(45) Date of Patent: Jun. 11, 2024

(54) PERMEABLE CONTAMINANT BARRIER SYSTEM

(71) Applicant: Ti-DOX Patent Inc., Calgary (CA)

(72) Inventors: Reinhard Schuetz, Calgary (CA); Dean Richard Neitz, Calgary (CA)

(73) Assignee: Ti-DOX Patent Inc., Calgary (CA)

( * ) Notice: Subject to any disclaimer, the term of this patent is extended or adjusted under 35 U.S.C. 154(b) by 927 days.

(21) Appl. No.: 17/034,473

(22) Filed: Sep. 28, 2020

(65) Prior Publication Data

US 2021/0113964 A1    Apr. 22, 2021

(30) Foreign Application Priority Data

Oct. 18, 2019   (CA) ..................................... 3059187

(51) Int. Cl.
*B01D 53/00* (2006.01)
*B01D 19/00* (2006.01)
*B01D 50/00* (2022.01)
*B01D 53/88* (2006.01)
*B01J 21/06* (2006.01)
*B01J 35/39* (2024.01)

(52) U.S. Cl.
CPC ............. *B01D 53/88* (2013.01); *B01D 19/00* (2013.01); *B01D 50/00* (2013.01); *B01D 53/007* (2013.01); *B01J 21/063* (2013.01); *B01J 35/39* (2024.01); *B01D 2255/20707* (2013.01); *B01D 2255/802* (2013.01); *B01D 2258/06* (2013.01); *B01D 2259/804* (2013.01)

(58) Field of Classification Search
CPC .............................. B01D 19/00; B01D 50/00
See application file for complete search history.

(56) References Cited

FOREIGN PATENT DOCUMENTS

WO    WO-2010058383 A1 *   5/2010   ........... A01K 1/0047

* cited by examiner

*Primary Examiner* — Robert A Hopkins
(74) *Attorney, Agent, or Firm* — WC&F IP

(57) ABSTRACT

An arrangement and process of mitigating contaminants has a flow element intermediate a first space with contaminated matter (including contaminated gas) and a second space. Contaminated matter is drawn from the first space into the flow element and then urged into segregated contaminated gas and residual contaminated matter collected in the second space. Segregated contaminated gas is merged with gas from the second space to form mixed gas and treated to form primary treated gas which is directed to generate at least some of the drawing of contaminated matter from the first space into the flow element. Mixed gas can be treated by passing it through passages in the flow element coated with decontaminating agent and/or through a decontamination unit. The flow element allows for air flow to effectively act as a one-way barrier obstructing migration of contaminated matter from the second space back to the first space.

48 Claims, 13 Drawing Sheets

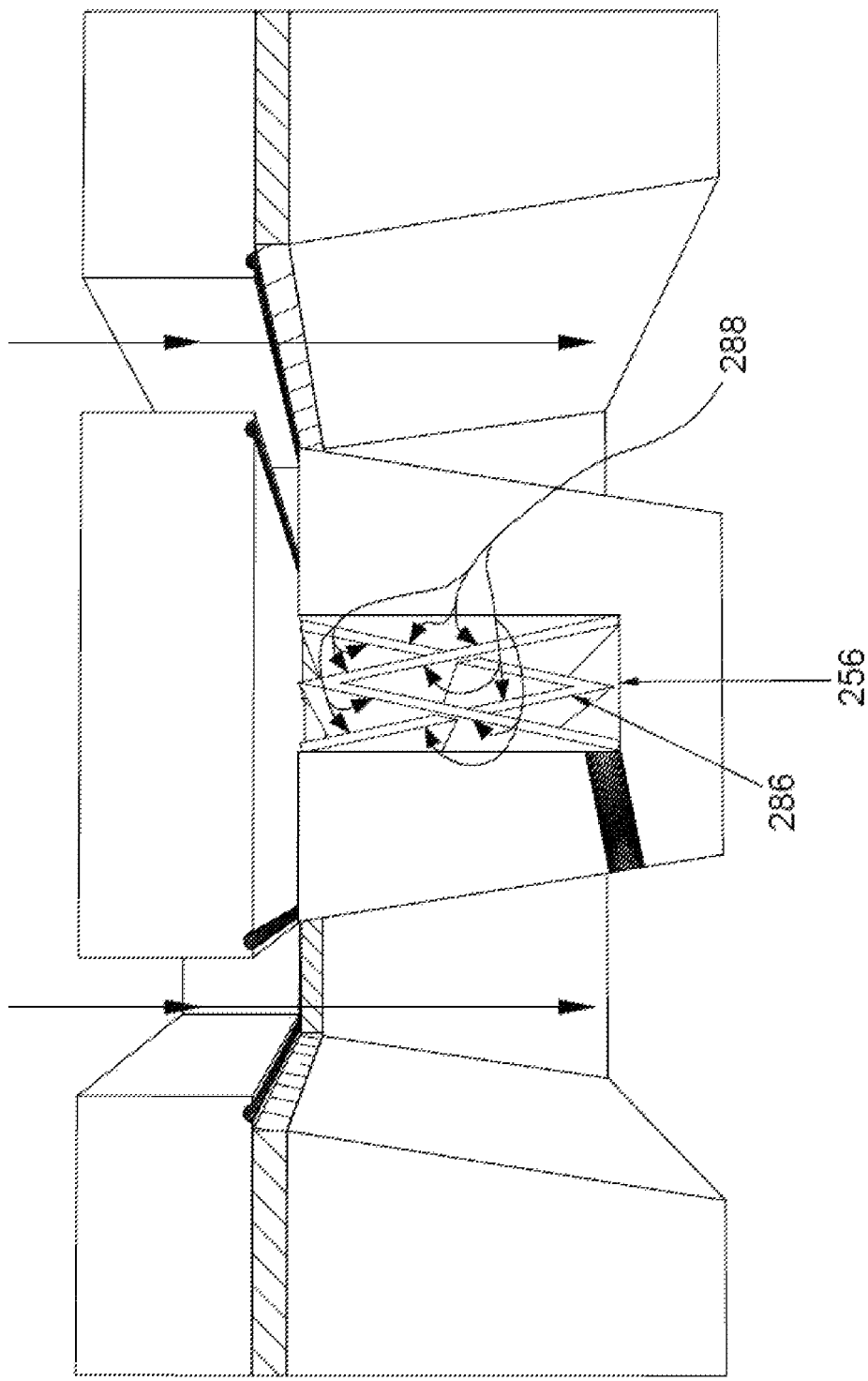

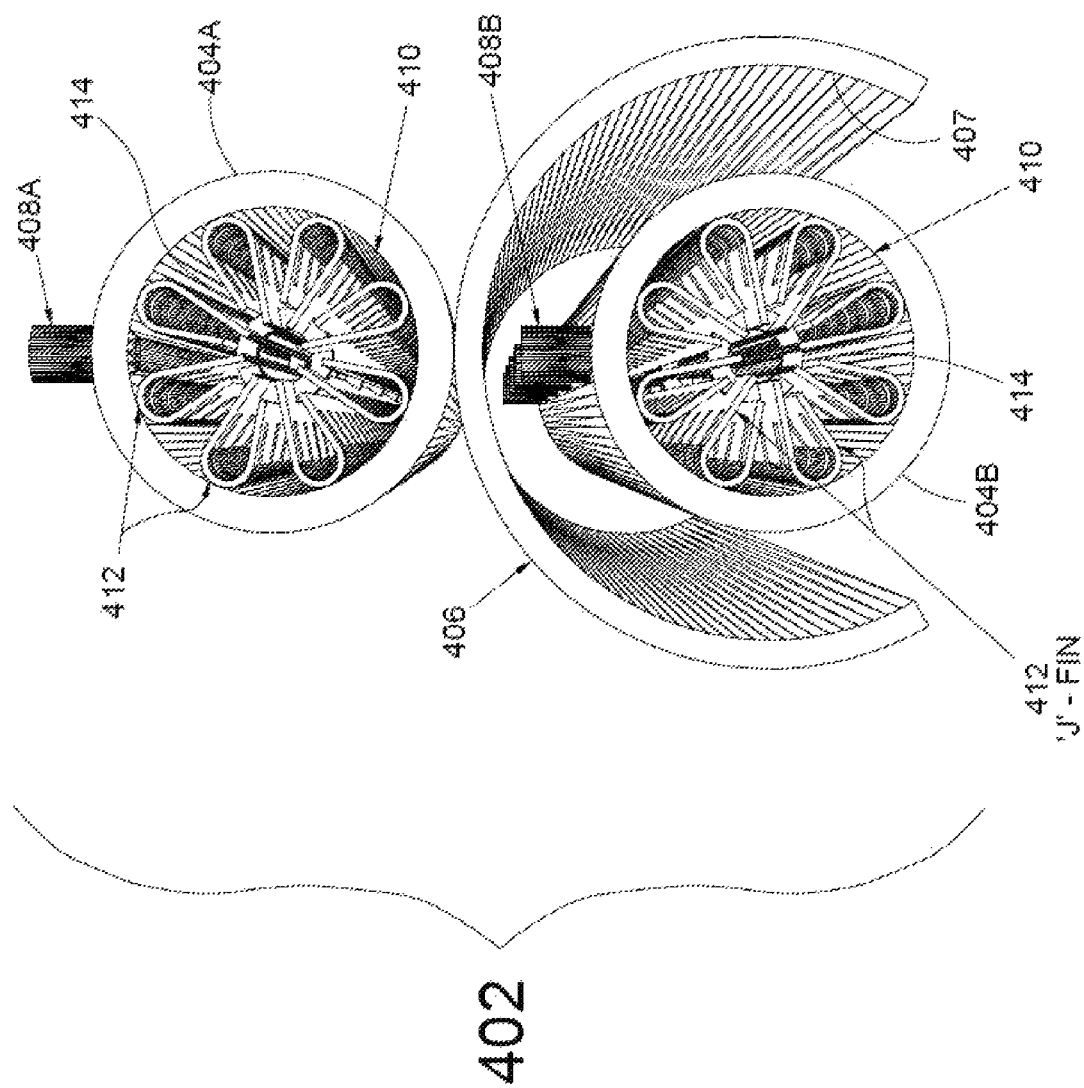

PERMEABLE CONTAMINANT BARRIER SYSTEM

FIELD OF THE INVENTION

The present invention relates to systems and arrangements for mitigating contaminants, but more specifically to systems that function as one-way barriers to allow contaminated matter in fluid and solid forms to flow therethrough from a first side to a second side and to obstruct migration back to the first side, in particular to systems that segregate gases from contaminated matter to then mitigate those segregated gases, and in one version relates to grate assemblies used in confined sump systems, such as in livestock operations, for managing waste and/or venting noxious fumes from enclosures for subsequent release and/or recirculation.

BACKGROUND OF THE INVENTION

Contaminants found in confined spaces, typically "indoors", tend to remain trapped within, especially airborne varieties, when contact with the ambient is limited and air exchange is poor. These indoor environments can and do become harmful to humans and other life forms. The natural tendency is to try to rid those contaminants by venting them "outside" into the ambient, and drawing outside air indoors. Although that is a common solution, it is a poor one, as it merely shuffles harmful contaminants from one place to another and ultimately pollutes our outdoor environment.

Examples of potentially contaminated indoor environments abound, not just in our homes and commercial workspaces, but in such diverse locations as confined airplane cabins, greenhouses and to the various animal enclosures in the livestock industry. The latter industry is noteworthy as modern era livestock operations have developed into significant sources of multi-form contaminants, such as germs, solids, liquids and gases, but the methods for dealing with these contaminants indoors have not improved and remain lacking, creating hazardous indoor conditions that can be difficult to deal with.

Regarding the commercial livestock industry, animal enclosures, such as "barns", often employ floor panels in the form of slotted floor gratings (eg: found in hog barns; dairy operations; sheep/goat enclosures; work shops; etc.) which have undergone minimal changes over time, except for use of different materials and design configurations. Typically, these floor gratings have numerous vertical openings, or slots, to allow contaminated waste material (normally urine/feces at animal enclosures and contaminated liquids at work shops) to drain into a sewer pit or sump below, and sometimes remain there for up to a year before disposal to another location. Open venting associated with these grating designs have for decades allowed noxious and toxic chemicals (eg: Ammonia; Hydrogen Sulfide; Benzene; Nitrogen Oxides; etc.) to escape into the atmosphere or enter confined living and work spaces. This can create harmful environments for humans, animals and plant species, and can contribute to the propagation of deadly diseases within animal enclosures. Similar arrangements and issues can and do arise in sewer systems, public works facilities and various types of Industries.

Available studies, reports, recommendations and operational reviews related to harmful substance control mainly focus on variations of somewhat labour-intensive and costly chemical infusions, filters, scrubbers, absorbents, oil toppings and/or exterior venting. None of these options address the pollution problem head-on, but instead merely redirect harmful contaminants and odours to another location, with the expectation that atmospheric dilution will take care of the pollutants.

What is therefore desired is a novel permeable containment barrier system and arrangement which overcomes the significant limitations and disadvantages of the existing designs. Preferably it should employ a one directional flow grate assembly which is neither a filter, scrubber nor absorbent and therefor does not require subsequent treatment for careful disposal of collected contaminants. It should not only allow unimpeded flow of expelled substances (such as urine/feces) from an enclosure into a sump, but should draw these substances from the enclosure through angled wall drains; segregate contaminated gas from other forms of contaminated matter; mitigate re-entry of harmful organisms, noxious fumes and toxic chemicals from the sump back into the enclosure; and reduce the effects of trapped toxic and odorous fumes via contact of contaminated gas with a decontaminating agent and/or treatment within a decontamination unit. Advantages of this system and arrangement should be a safer and healthier enclosure environment for humans, animals and plant species, reduced air exchange requirements and associated heating costs, mitigation of indoor/outdoor air contamination and lower installation/operating expenses.

SUMMARY OF THE INVENTION

A process of mitigating contaminants comprising: providing a flow element intermediate a first space and a second space, the first space having contaminated matter with at least some contaminated gas; drawing the contaminated matter from the first space into the flow element; segregating at least a portion of the contaminated gas away from the contaminated matter resulting in segregated contaminated gas and residual contaminated matter; collecting the residual contaminated matter in the second space for further processing; merging the segregated contaminated gas with gas from the second space to form a mixed gas; treating contaminants in the mixed gas to form a primary treated gas; and, directing the primary treated gas to generate at least some of the drawing of contaminated matter from the first space into the flow element.

BRIEF DESCRIPTION OF THE DRAWING FIGURES

Embodiments of the invention will now be described, by way of example only, with reference to the accompanying drawings, wherein:

FIG. 5C is a close-up view in cross-section of an air passage from the flow element of FIG. 5 showing a third version of a novel fin member housed therein;

DETAILED DESCRIPTION OF THE INVENTION

Figure 1:
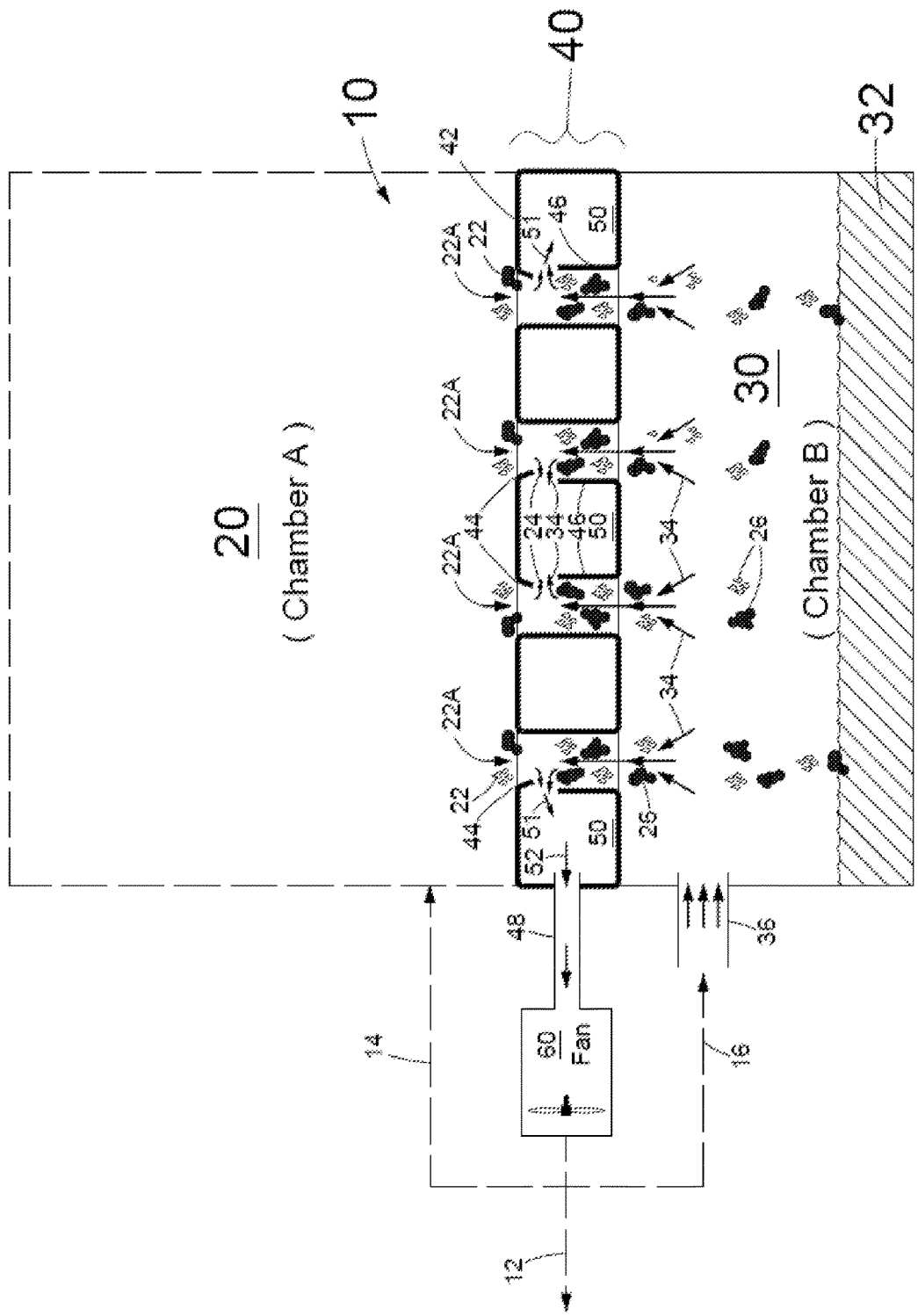
FIG. 1 illustrates in transparent cross-section the general function of a system for capturing and treating contaminants according to a first embodiment of the present invention where a flow element utilizes negative air pressure for drawing and segregating contaminated matter.

The figures show a contaminant capture and treatment system (generally designated by reference numeral 10) having a flow element 40 located intermediate a first space 20 with contaminated matter and a second space 30. The first space is where the contaminated matter is created and/or found, and the second space is capable of receiving and/or collecting contaminated matter. The contaminated matter may contain one or more contaminants in the form of contaminated gas, contaminated liquids and contaminated solids. The first space 20 will be shown as being located vertically above the second space 30 for ease of illustrating the various features and function of the system, but it should be appreciated that this system works in a variety of orientations, whether the relative positioning of the spaces is inclined or even horizontal. Hence, terms such as "front" or "forward", "rear" or "backward", "upper", "lower" and the like may be employed for identifying certain features of the system, but their use is not intended to limit the system's function or orientation. Further, when describing the invention, all terms not defined herein have their common art-recognized meaning.

In a first embodiment of the system illustrated in FIG. 1 the first space 20 is defined by chamber A which contains contaminated matter 22 and has some degree of communication with an air source, typically the ambient, so as to avoid creation of a vacuum therein. The second space 30 is defined by chamber B for receiving and collecting contaminated matter, which eventually should be processed in some manner. The flow element 40 acts as a type of one-way barrier between the chambers A and B to control the flow of matter therebetween, and in particular to avoid migration of contaminants from chamber B back to chamber A, as will be described. The present system can be used in a wide variety of settings, examples of which include:

chamber A being confined housing and for livestock where flow element 40 forms a static permeable barn floor and chamber B is an enclosed sump for holding effluent and discharge from chamber A;

to chamber A being a defined ambient space where flow element 40 forms a floating permeable barrier and chamber B a contaminant sump. The former housing scenario will be used for ease of visualizing and describing the present invention.

The flow element 40 has a grated surface 42 adjacent the chamber A with a plurality of openings 44 functioning as entry points for the contaminated matter 22 from chamber A into the flow element 40. In many applications contemplated for this system 10, the contaminated matter should be a combination of "flowable" materials, namely contaminated gas from within the confines of the chamber A and a mix of contaminated liquids and contaminated solids on or near the grated surface. The contaminated matter 22 is drawn (as indicated by arrows 22a) into an arrangement of flow conduits 46 in the flow element by gravity in the FIG. 1 configuration, and with the aid of a suction, or vacuum, effect created by the flow element via a plurality of air passages 50 which cooperate with the flow conduits. This suction effect helps segregate at least some, if not all, of the contaminated gas away from the contaminated matter, resulting in the segregated contaminated gas (indicated by arrows 24) being sucked into the flow element's air passages 50 and the remaining, or residual, contaminated matter (mostly liquids and/or solids; indicated by 26) flowing—in this case dropping—into chamber B, and more specifically to a holding area 32 of chamber B where the liquids and solids can be collected and held for further suitable processing, including disposal. The aforementioned suction effect also draws gas from chamber B (indicated by arrows 34) into the air passages 50 where they merge with the segregated contaminated gas 24 to form a mixed gas (indicated by arrow 51). The gas drawn from the chamber B may be ambient "fresh" air from one or more inlets 36 with or without varying amounts of contaminated air vapourized from the residual contaminated matter in the holding area 32. The inlet(s) 36 should be of a one-way variety to avoid unwanted escape of any contaminated gas out of chamber B to the ambient.

One important aspect of this invention is that as this mixed gas travels through the air passages 50 the contaminants therein are treated (sometimes referred to as "purified"), in this case significantly destroyed, to form a primary treated gas. This treatment is achieved by coating the passages with a decontaminating agent, such as a photocatalytic coating capable of destroying at least some toxins present in the mixed gas. One coating that has been found to be particularly effective is Titanium Dioxide (TiO2), where tests have shown upwards of a 50% destruction rate of targeted toxins, without the use of an energy source such as UV light. For such treatment to be effective, the mixed gas should contact as much decontaminating agent as possible to transition it to [transform into the] primary treated gas, and as such is channeled through the labyrinth of passages 50 and is directed downstream to one or more air outlets 48 of the flow element. It is preferred to merge the channeled primary treated gas to a single outlet for simplicity of operation, and so a single outlet 48 will be assumed for this embodiment for ease of illustration. The outlet 48 should communicate with a fan unit 60, or similar, configured to draw the primary treated gas out of the flow element (indicated by arrow 52), thus creating a negative pressure within the flow element's passages 50 and the aforementioned suction effect at the flow conduits 46.

In the FIG. 1 embodiment the primary treated gas 52 can be exhausted to the ambient, or optionally some or all of it may be recirculated to chamber A and/or chamber B (indicated by arrows 12, 14 and 16 respectively). In the case of exhausting back into chamber A via line 14, the quality of the primary treated gas entering chamber A should be superior to the contaminated gas being drawn from the chamber A into the flow element, with the contaminants 22, which should be considerably more beneficial to any human, animal and plant species occupying chamber A over current arrangements.

Figure 2:
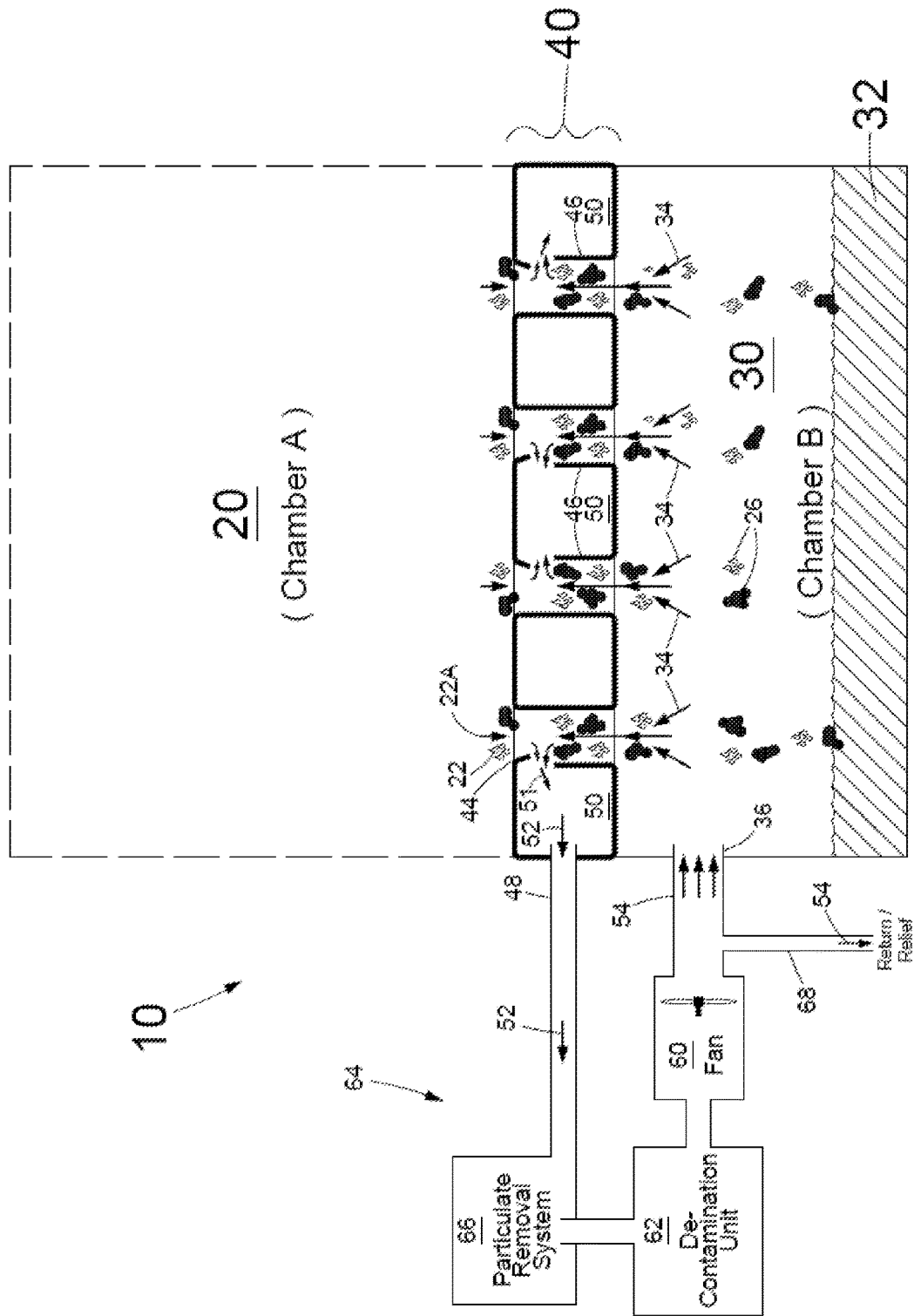
FIG. 2 illustrates in transparent cross-section the general function of the present system according to a second embodiment which is similar to the first embodiment but employs a piping arrangement for moving gases through a decontamination unit.

Another important aspect of the present invention is the possibility to advantageously further treat the primary treated gas 52 exiting the flow element 40, as illustrated by a second embodiment in FIG. 2, by passing it through a decontamination unit 62 to form a secondary treated gas, meaning additionally or twice treated. A preferred arrangement for adding the decontamination unit consists of connecting one end of a piping system 64 to the outlet 48 of the flow element to receive the stream of primary treated gas 52 and to direct it into the decontamination unit 62. A preferred version of decontamination unit is a UV Light Reactor (called a "UV-DOX" unit) for mitigation of harmful organisms and/or contaminated fluids as described in applicant's co-pending U.S. patent application Ser. No. 15/924,255 and Canadian patent application 2,961,429. The piping system may advantageously include a particulate matter removal system 66, or filter, upstream of the decontamination unit and downstream of the flow element outlet 48, namely intermediate to the outlet and decontamination unit, for removing any unwanted particles from the primary treated gas stream before it enters the decontamination unit. The fan unit 60 may be located at any convenient point along the piping system for moving gases therethrough, but is preferably located downstream of the decontamination unit for urging the secondary treated gas (indicated by arrows 54) from the decontamination unit and toward the chamber B, which will also create the desired draw of primary treated gas 52 from the flow element and through the particulate matter removal system. At this location the fan unit should remain cleaner longer than if placed upstream of the particulate filter, for instance.

The piping system 64 may have an optional relief conduit 68 downstream of the fan unit 60 for diverting a portion of the secondary treated gas 54 to a location other than chamber B, namely to the ambient and/or to the chamber A. It is possible to locate the relief conduit elsewhere, such as between the decontamination and fan units, or even upstream of the decontamination unit if diversion of the primary treated gas stream is desired or acceptable in specific circumstances. Nonetheless, in the second embodiment of FIG. 2, it is contemplated that the bulk, or all, of the secondary treated gas 54 is vented into the chamber B via its inlet 36 where it co-mingles with other gas present therein. This "co-mingled" gas is then urged from chamber B (indicated again by arrows 34) into the flow element conduits 46 by the aforementioned suction effect to create the mixed gas 51 as described for the first embodiment.

Figure 3:
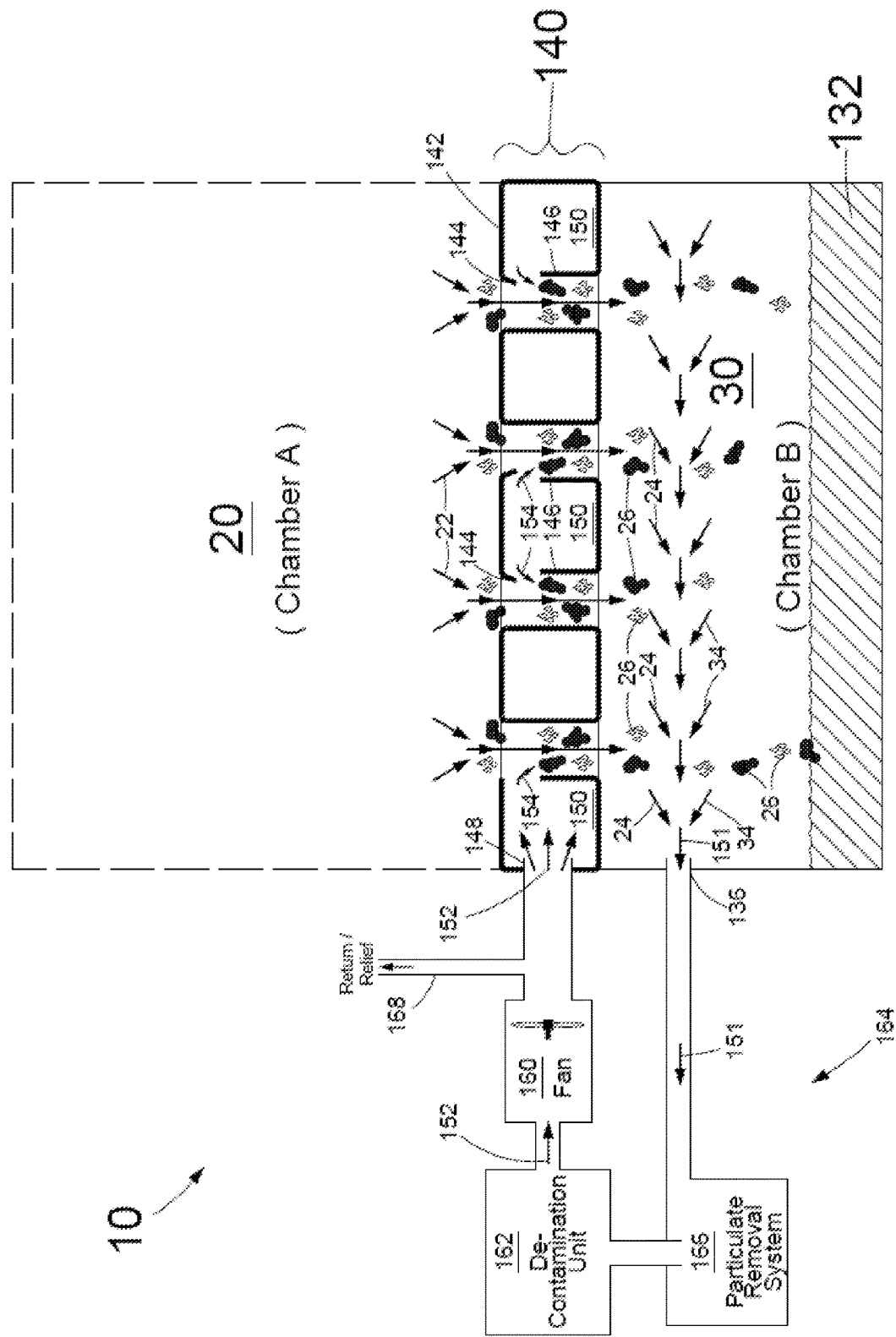
FIG. 3 illustrates in transparent cross-section the general function of the present system according to a third embodiment where a flow element utilizes positive air pressure for drawing and segregating contaminated matter, and includes a decontamination unit.

Whereas the first and second embodiments describe a "negative pressure" scenario where air is drawn out of the flow element (at outlet 48) to create a desired circulation and treatment of contaminated gases, a third embodiment of the invention shown in FIG. 3 illustrates yet another important aspect of the invention where the desired circulation and treatment of contaminated gases is achieved with a reverse air flow pattern to pump air into the flow element 140 to create a "positive pressure" scenario. Reference numerals with the prefix "1" are used to identify some like elements from the first two embodiments.

The piping system 164 of FIG. 3 is in effect a reverse of the earlier piping system 64 in that the fan unit 160 is oriented to blow into the flow element 140 via its inlet 148 (formerly outlet 48), and the opposed end of the piping system creates a suction to draw gases from the chamber B at its outlet 136 (formerly inlet 36). The decontamination unit 162 remains located upstream of the fan unit 160, the particulate filter 166 is upstream of the decontamination unit and downstream of the chamber B outlet 136 (which corresponds to and communicates with an inlet of the piping system 164), and the relief conduit 168 is downstream of the fan unit. In this embodiment, as the contaminated matter 22 is drawn from the chamber A and passes through the flow conduits 146 into the chamber B, it substantially segregates into contaminated gas 24 and residual contaminated matter 26 which drops into the holding area 132 of chamber B for further processing. This segregated contaminated gas, together with the other gases 34 from chamber B, are drawn toward and through the outlet 136 to form a mixed gas stream 151. It is noted that the outlet 136 should exit chamber B at a point below the flow element 140 and preferably away from (in this case above) the holding area 132 to avoid ingesting residual contaminated matter (i.e. liquids and solids) into the piping system 164. The particulate filter 166 downstream of the outlet 136 should remove any solids and liquids that might be inadvertently ingested with the mixed gas stream 151 before it arrives at the decontamination unit.

One of the many important advantages of this invention is that contaminated gas is not released to the ambient without some level of treatment, unlike with conventional hog barns for instance, but rather passes the mixed gas stream 151 to the decontamination unit 162 where it is treated and released as a more desired "cleaner" stream of primary treated gas 152. The downstream fan unit 160 then urges this primary treated gas 152 to flow into the flow element 140 via its inlet 148, keeping in mind that at least a portion of the primary treated gas can optionally be diverted through the relief conduit 168 to the ambient for safety relief and/or to chamber A as a "mitigated air" return. Directing the primary treated gas 152 into the flow element 140 creates a "positive pressure" within the flow element which in turn contributes to the drawing of contaminated matter 22 from the chamber A into the flow element through the openings 144 in the grated surface. More specifically, the primary treated gas 152 directed through the inlet 148 is channeled through the plurality of air passages 150 towards the flow conduits 146 where a suction effect is created to contribute with drawing contaminated matter to the flow element. These air passages 150 are preferably coated with a decontaminating agent for further desired treating and destruction of contaminants in the primary treated gas as it travels therethrough, thereby forming a secondary treated gas 154 by the time the gas flow reaches the flow conduits 146. A preferred decontaminating agent is a reactive coating much like in the earlier embodiments, such as Titanium Dioxide (TiO2). For such treatment to be effective, the primary treated gas should contact as much decontaminating coating as possible to transition it to secondary treated gas, and therefore it is channeled through the labyrinth of coated passages 150 and is directed to the various flow conduits 146.

The flow conduits 146 are configured to aim the secondary treated gas (as indicated by arrows 154) from the flow element passages 150 in such manner toward the chamber B to create a suction effect at the grated surface openings 144 to help draw the contaminated matter into the flow element flow conduits 146. When the secondary treated gas 154 engages and urges the contaminated matter into the chamber B, the secondary treated gas not only becomes one of the earlier mentioned chamber B gases 34 but also merges with the segregated contaminated gas 24 (which has separated from the residual contaminated matter 26) to form the mixed gas 151 which is drawn into the piping system 164, to be treated again in the decontamination unit 162, and potentially again in the flow element 140. This gas treatment "loop" not only results in dilution of contaminated gas entering the Chamber B, but allows at least a portion of contaminated gas to potentially be treated in multiple passes through the decontamination "zones" (i.e. the decontamination unit and coated air passages) before being discharged back into chamber A or the ambient. Therefore it should now be readily apparent this flow element arrangement 140, as well as the earlier embodiment 40, ensures that once contaminated gas is drawn from the chamber A to the chamber B, it is not permitted to return into chamber A (or to be vented to the ambient) without some measure of decontamination treatment and dilution with treated gas. Such flow elements may be commercially marketed and distributed as "UniGrates", signifying their distinct advantage of one directional (or "uni") flow.

Figure 4:
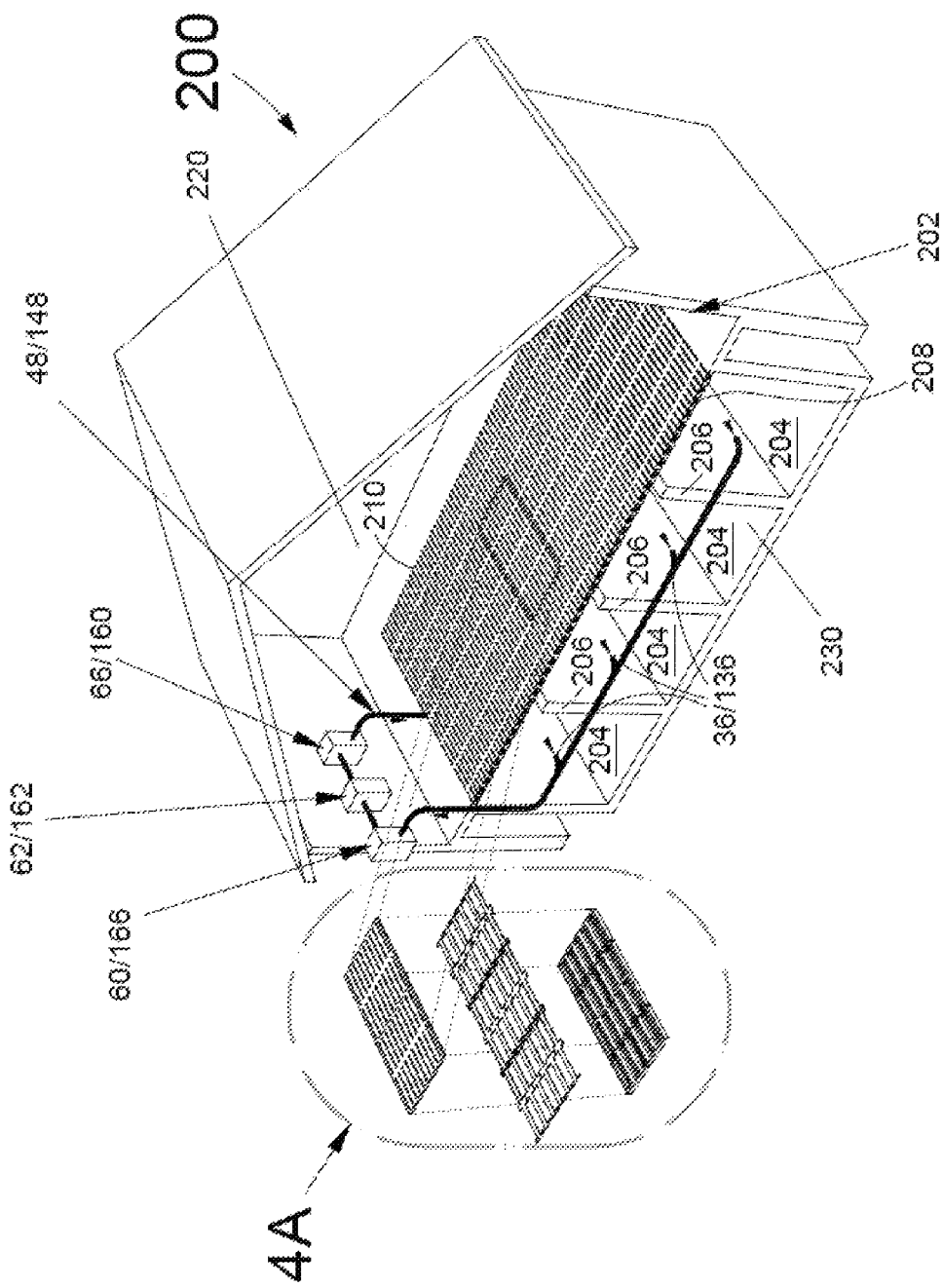
FIG. 4 illustrates in a cut-away perspective view an example of an environment for using the present system, namely a structure used as a barn to house livestock such as hogs, with one of the flow elements of the barn floor magnified in the circled portion indicated by reference numeral 4A.

Some preferred flow element arrangements will now be described. All should be suitable for use in both negative and positive pressure systems, unless indicated otherwise. As noted earlier, the present invention may be employed in a wide variety of settings, and so a barn 200 is chosen and shown in FIG. 4 as a suitable environment to illustrate several versions of the flow element's structure and use, since the present invention may advantageously be retrofitted into many conventional barns. The barn 200 of FIG. 4 has a main room defining a first space 220, or chamber A, for housing and dealing with livestock, such as hogs for illustrative purposes, which produce large quantities of "flowable" contaminated matter in the form of animal waste which deposits on the barn floor 202 and noxious gases which permeate the airspace of chamber A. The floor 202 is typically located above a cavernous sump 204, which defines a second space 230, or chamber B, whose purpose is to receive and hold the contaminated matter falling thereinto through the multiple voids of a traditional hog barn floor. A number of vents, similar to the earlier discussed outlets 136, will often be present to expel fumes from the sump to atmosphere. Due to the vast expanses of many barn floors, prior art sumps 204 typically have a number of spaced wall or column members 206 to support a sub-floor framework (largely unseen but indicated by 208) that in turn support a deck (location indicated by 210) which forms the top layer of the floor 202 for generally supporting livestock, humans and equipment. The prior art decks are typically slotted or perforated to allow animal waste to fall through the floor into the sump below, and are unable to control or stop the flow of noxious gases up from the sump (chamber B) back into the barn's holding area (chamber A), among other shortcomings. The flow elements of this invention are meant to provide an alternative to prior art decks, to form a new and vastly improved barn floor, as illustrated in FIG. 4 where one of the retro-fitted flow elements is magnified in the circled portion indicated by the reference numeral 4A.

Figure 4A:
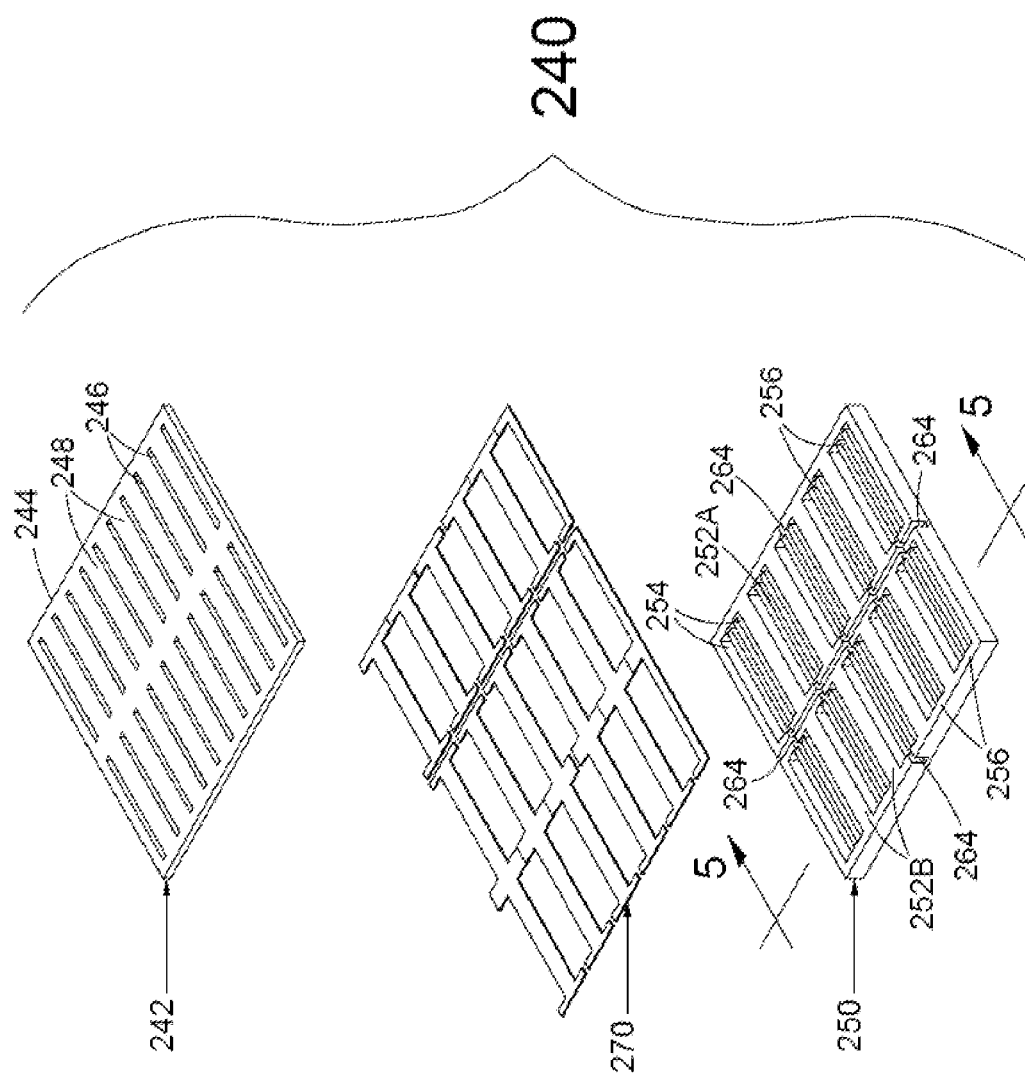
FIG. 4A is a close-up exploded perspective view of the flow element in the circled portion of FIG. 4 indicated by reference numeral 4A.
Figure 5:
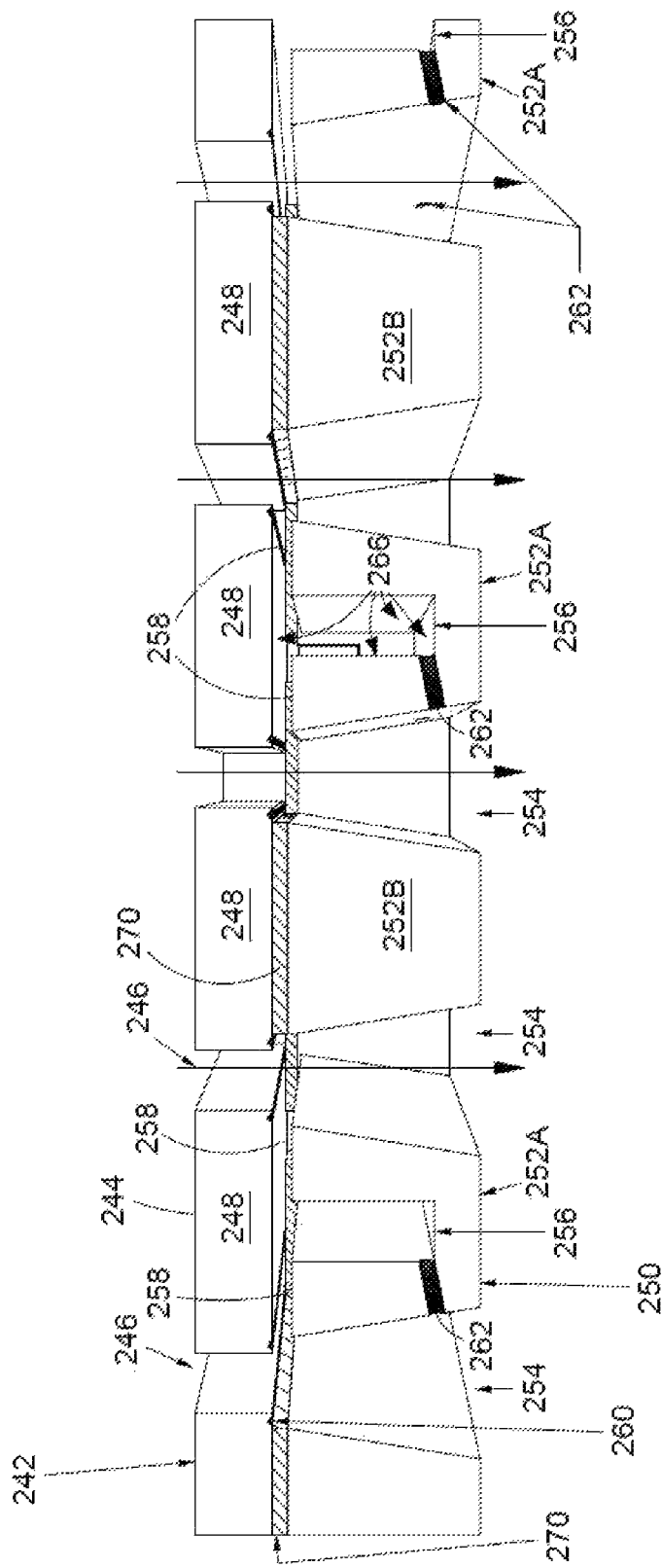
FIG. 5 is a cross-sectional view along the line 5-5 of a segment of the flow element of FIG. 4A (in assembled form)

Referring next to FIG. 4A, the three principle components of one version of the flow element 240 are shown in a vertically exploded view, namely a top grate portion 242, a bottom grate portion 250 and a gasket portion 270 adapted to be sandwiched between the top and bottom grate portions to provide a seal, and the top grate with cushioned support. Referring to FIG. 5 as well, the top grate 242 has a generally planar upper surface 244 with a plurality of openings 246 in the form of a spaced pattern of elongated slots (or other desired pattern) forming slats 248 therebetween, defining a grated surface to be located adjacent the chamber A. The top grate 242 and bottom grate 250 are suitably fortified or reinforced for supporting livestock thereon by ensuring it is made of a suitable structural material.

The bottom grate 250 has a pattern of spaced ribs 252 creating openings 254 therebetween mirroring that of the top grate, so that the slats 248 of the top grate 242 generally align with the ribs 252 of the bottom grate 250, and the openings 246 of the top grate generally align with the openings 254 of the bottom grate. These openings 254 define the earlier described flow conduits which, in conjunction with the top grate slots 246, permit the movement of contaminated matter and other gases through the flow element. The bottom grate further has a labyrinth of hollow spaces defining linked air passages 256. Although these passages could extend through every rib 252, in this first version of the flow element the passages 256 are limited to every second hollow rib 252A whose spacing alternates with solid ribs 252B. This alternating pattern of hollow and solid ribs 252A, 252B allows the flow element to function as intended (as will be seen shortly), and additionally allows the solid ribs 252B to provide a desired distributed support to the top grate 242 via the sandwiched gasket 270; and is cost efficient to manufacture since solid ribs require less fabrication effort. Each hollow rib 252A omits the intermediate gasket 270 which results in a cavity 258 between the top and bottom grates on both sides of each passage 256, allowing air communication between each passage and adjacent flow conduits 254 on either side of a given hollow rib 252A. It is the air flow through these cavities 258, whether in an "inward" direction (ie. from the cavities into the air passages 256) in a negative pressure scenario, or in a reverse "outward" direction (ie. from the air passages to the cavities) in a positive pressure scenario, that gives rise to the earlier described drawing of contaminated matter from chamber A into the flow element, subjecting it to other associated novel functions of the flow element and blocking migration of contaminants from chamber B to chamber A.

The flow element illustrated in FIG. 5 has several further features to enhance function. Each conduit 254 is flared outwardly in the direction of chamber B to facilitate unhindered flow of contaminated matter from chamber A toward chamber B. In a negative pressure scenario this flaring also helps funnel gases from the chamber B toward the flow conduits 254, which flow assists in the drawing and segregating of contaminated gases first into the cavities 258 and then into the air passages 256. In a positive pressure scenario this flaring helps deflect and direct the gases exiting the cavities 258 toward the chamber B, which flow assists in the drawing of contaminated gases into the flow conduits 254 and subsequently the segregating of contaminated gases therebelow. The bottom outside edge of each top grate slat 248 is grooved, as at 260, and is widened to protrude over, or overhang, the flow conduit 254, to direct contaminated matter (particularly liquids and solids) from the top grate slots 246 into the respective conduits below and avoid entry into the cavities 258, to avoid soiling the air passages 256.

Any such matter that might enter the air passages has the opportunity to bleed into chamber B via the numerous downwardly inclined drains 262 piercing the hollow ribs 252A. It is noted that drains 262 function to empty the air passages 256 of liquids and debris if a user lifts the top grate 242 away from the bottom grate 250 to periodically access the air passages and flush them out, which is an advantageous feature of this novel flow element 240.

Referring again to FIGS. 4 and 4A, it should be appreciated that a retro-fitted barn floor 202 will be formed in a grid pattern of numerous flow elements 240 laid like tiles in abutting relationship. The air passages 256 of adjacent flow elements must be able to communicate so as to channel gas streams to or from one or more outlets 48/inlets 148 in both negative and positive pressure scenarios, as the case may be. As such, as best seen in FIG. 4A, the labyrinth of air passages 256 in each flow element should be arranged to communicate with at least one aperture 264, or "interconnect", located at the peripheral edge of the bottom grate 250. The interconnects 264 of abutting flow elements will accommodate the flow-through of gases therebetween, thus allowing the cross-communication of air passages 256 across an entire floor 202 made of flow elements 240. Interconnects 264 may be selectively blocked should a user wish to create distinct air flow "zones" in a desired floor pattern, to communicate with more than one outlet 48/inlet 148 for instance. It will be appreciated that flow elements 240 configured as squares would be simplest to use via alignment of interconnects 264 in a grid pattern, but other geometric shapes can also work, such as rectangular ones.

An aforementioned important aspect of this invention is the ability to treat contaminated gases as they travel through the flow element air passages. In the embodiment shown in FIG. 5 this treatment is achieved by coating all sides of each air passage 256 with a decontaminating agent 266. As it is desireable to maximize the contact of gases with the decontaminating agent, then other flow element surfaces may be coated as well, such as the surfaces of the cavities 258 which lead to/from the air passages. Some surfaces, such as those of the flow conduits 254, are less desireable to coat as they will likely be readily covered with contaminated matter and grime, and so it may be more cost efficient to merely omit coating these surfaces. Although the coated air passages and cavities will likely get grimy over time as well, fortunately they can be readily accessed and cleaned by lifting the removable top grate as noted earlier.

Figure 5A:
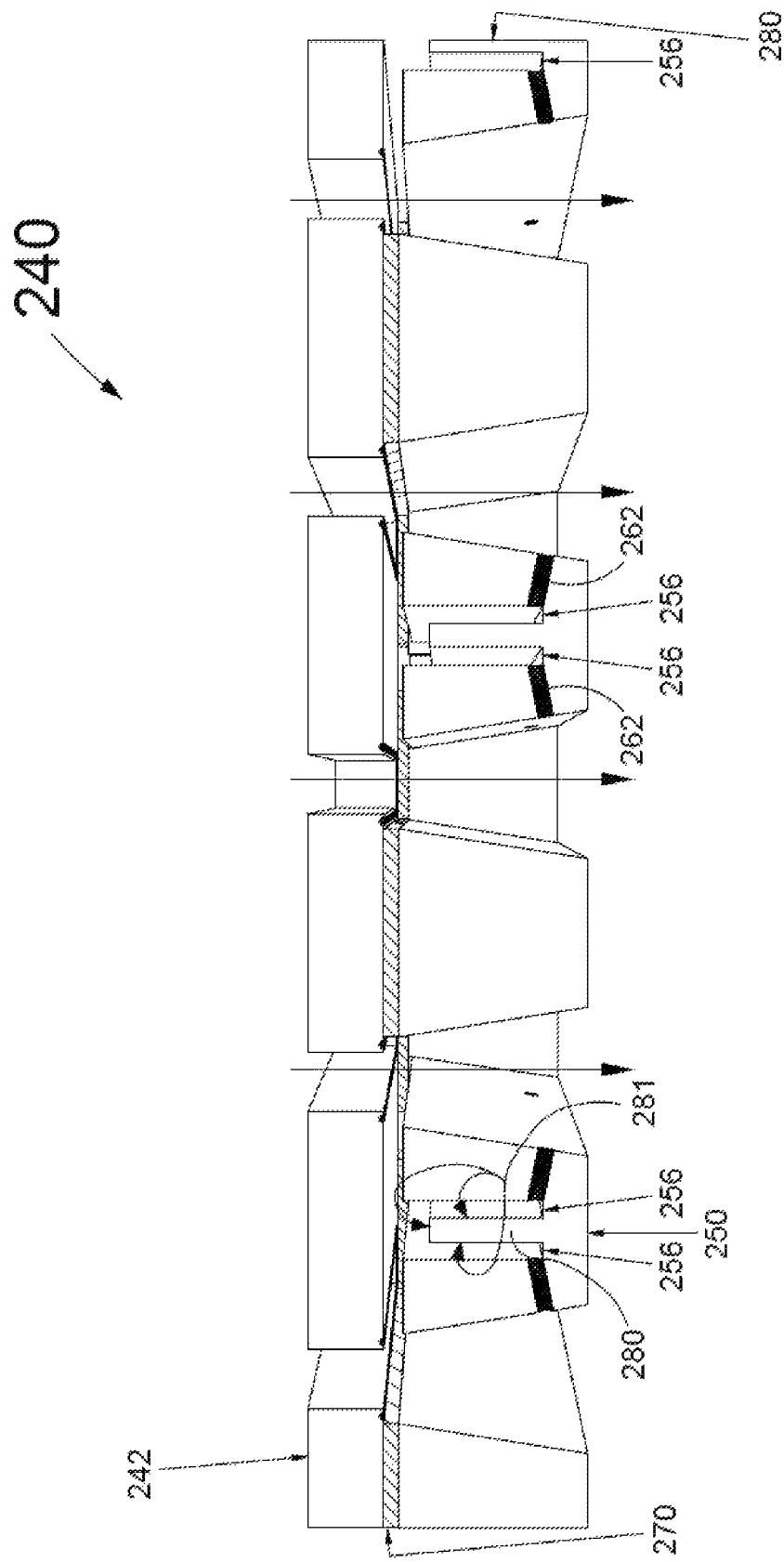
FIG. 5A is a view similar to FIG. 5 showing air passages of the flow element housing a first version of a novel fin member therein.
Figure 5B:
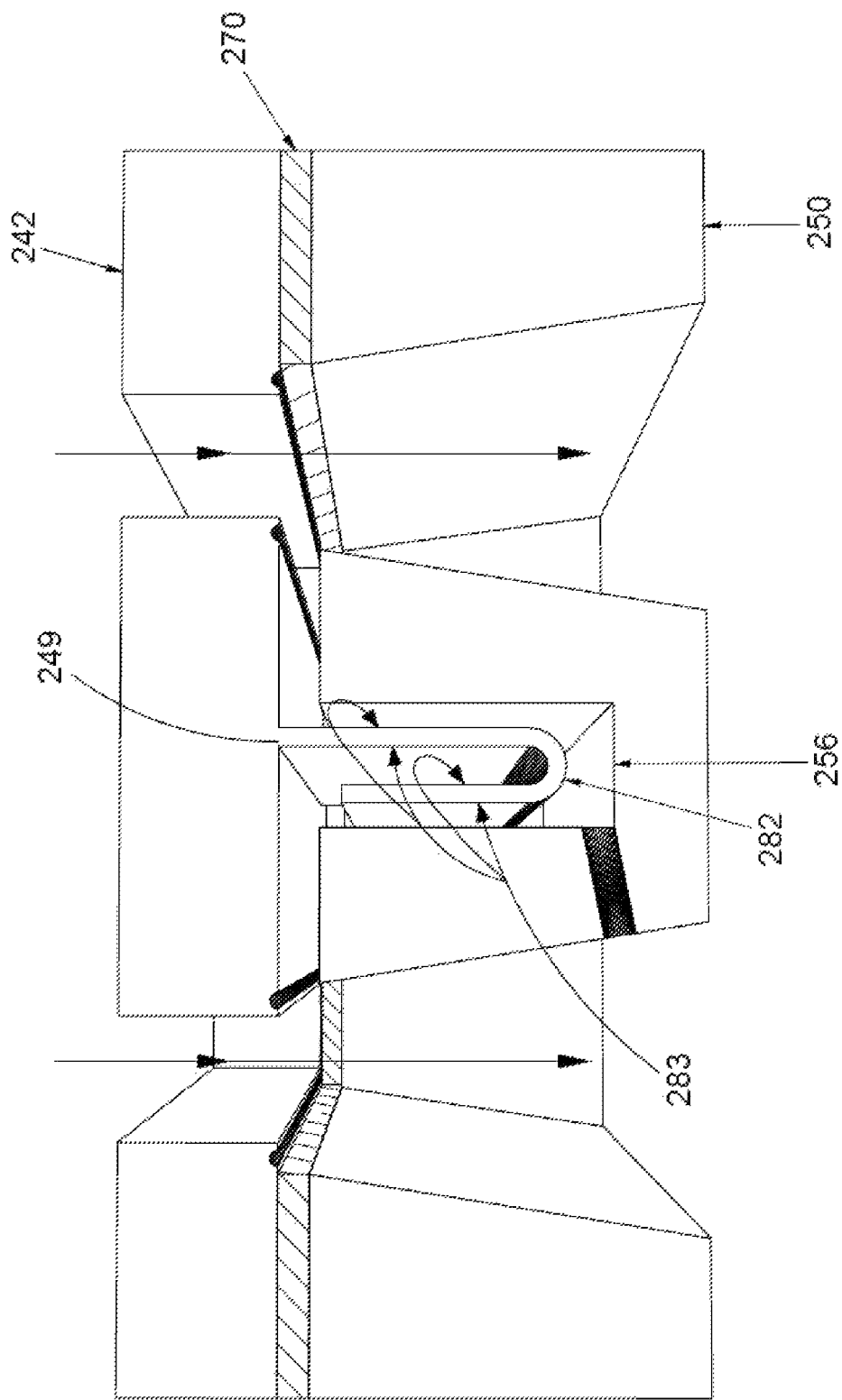
FIG. 5B is a close-up view in cross-section of an air passage from the flow element of FIG. 5 showing a second version of a novel fin member housed therein.

Other novel features may be added to the flow element 240 to further enhance treatment by increasing the gas-to-decontaminating agent contact area. FIGS. 5A to 5C illustrate various versions of fins introduced into the air passages 256 to achieve this goal. In FIG. 5A, an upright linear fin 280 is located within the air passage 256, supported from the base of the air passage but spaced from its side walls. Hence, the exposed surfaces 281 of the fins can be coated with the decontaminating agent, in addition to the surfaces of the air passages. In this embodiment drains 262 are located on both sides of the hollow ribs 252A, to drain any fluids from the air passage on each side of the fin. These additional drains can be avoided by instead "hanging" the fins from underneath the top grate 242, leaving the base of the air passages 256 exposed for coating with decontaminating agent and able to drain to one side. One such alternate "hanging" version is shown in FIG. 5B where a J-shaped fin 282 is shown attached underneath the top grate 242 at point 249. The J-fin provides even more coated surface areas 283 for contact with gases than the linear fin 280, as the number of exposed vertical members is effectively doubled. The U-shaped base of the J-fin may need some drain holes or be slightly sloped to bleed any fluids from that bend. In yet another version of fin configuration shown in FIG. 5C, an "X-shaped" fin 286 may be provided within the air passages 256 to provide numerous exposed surfaces 288 available for coating with decontaminating agent. These surfaces 288 would be somewhat discontinuous, such as with spaced perforations, to allow gasses to flow into and through each of the sub-passages created by this fin arrangement, to avoid "dead spaces" and avoid undue obstruction of air flows through the bottom grate. It is noted that in each of these fin versions the air passages might need to be widened somewhat to accommodate a desired quantity of air flow therethrough.

The flow element of the present invention may take yet other advantageous configurations by relocating air passages externally of the ribs of the bottom grate. Referring to a first version of such "externally configured" flow element 300 illustrated in FIG. 6A, each air passage 302 is formed by a hollow structural section, or pipe, running parallel to and spaced below the arched bottom surface 306 of a respective rib 304 of the bottom grate 310. Each pipe 302 has a plurality of spaced orifices 308 aligned longitudinally along the apex, or upper spine, thereof. The pipes are arranged in a like labyrinth or pattern as the earlier described "internal" air passages 256 for cross communication with neighbouring flow elements and eventually with one or more outlets/inlets 48, 148 of the contaminant capture and treatment system 10. Hence, in a positive pressure scenario, gas travelling through the pipe 302 and exiting via the orifices 308 should impact the arched surface 306 and be deflected at an angle toward an adjacent conduit 312 of the bottom grate and downwardly toward the chamber B (330) as indicated by the arrows 307, to create the desired suction effect and drawing of contaminated matter 322 from the chamber A (320) through the slots 316 of the top grate 314. Conversely, in a negative pressure scenario, gases should be sucked into each pipe 302 via the orifices 308 from the adjacent conduits and from the chamber B, as indicated by arrows 309, to create the desired suction effect and drawing of contaminated matter 322 from the chamber A (320) through the openings 316 of the top grate 314. The arched bottom surface 306 of each rib, coated with a decontaminating agent, should act as a canopy to shield the orifices 308 from ingesting the liquid and solid contaminated matter descending through the flow conduits 312, while allowing the earlier discussed segregation of gases. The internal surfaces of the pipes 302 should also be coated with the desired decontaminating agent to treat contaminated gases flowing therethrough.

This external configuration of air passages has several advantages, one being that the top grate 314 need not be lifted from the bottom grate 310 for accessing and cleaning the passages. Rather, the pipes 302 may be cleaned by running water or other cleaning agent through the pipes under pressure to flush the pipe network of debris via the orifices 308 or other accessible clean-out valves (not shown). Also, "externally" locating the pipes 302 avoids the need to manufacture ribs with the internal passages 256 and drains 262 shown in FIG. 5, thus avoiding fabrication costs, and allows each top grate slat 318 to be supported on a respective bottom grate rib 304, via the intermediate gasket 324.

A second version of an externally configured flow element 400 illustrated in FIG. 6B has the same configuration of top grate 314, gasket 324 and bottom grate 310 as in the first version in FIG. 6A, but has another novel configuration of air passages 402 located below the ribs 304 for increasing the amount of contact between decontaminating agent and gases flowing therethrough. Referring also to the detailed view in FIG. 6C, each air passage 402 has a double arrangement of pipes 404A and 404B, vertically stacked and spaced. Both pipes 404A and 404B have the same or similar configurations, but the top pipe 404A is located closest to a respective rib 304, and is spaced below the arched bottom 306 as in the first version in FIG. 6A, whereas the bottom pipe 404B is spaced below the top pipe 404A and is provided with its own dedicated canopy 406 to shield the orifices 408B from ingesting liquids and solids in the same manner as the canopy 306, illustrated in FIG. 6A, shields the orifices designated as 408A in FIG. 6C. The internals of both pipes 404a, 404b differ from the earlier external pipe 302 in that not only are the internal peripheral surfaces 410 of the pipes coated with decontaminating agent, but are also fitted internally with a plurality of "J" fins 412 of a type described and shown in FIG. 6C, and are arranged about and supported from an internal pipe core element 414 in a formation creating a "rosette" pattern. In addition, the internal surface 407 of the canopy 406 is also coated with a decontaminating agent. As will be appreciated by those skilled in the art, any gasses passing through the pipes 404A, 404B and the internal canopy surface 407 will contact a plethora of coated surfaces of a vastly greater order of magnitude than in the first version of pipe 302, for instance. This configuration is particularly advantageous where a user wishes to omit the earlier described decontamination unit 62 (FIGS. 2 and 3) and prefers to maintain treating of contaminants within the flow element 400 exclusively. A further advantage of this double pipe arrangement is the option of operating with reversed pressures simultaneously in the pipes, for instance by providing a positive pressure (designated "+P" in FIG. 6B) in the top pipe 404A to provide the same type of air flow 307 as in FIG. 6A which creates the desired suction effect at the slots of the top grate (allowing the flow element to function as an "air barrier"), and by providing a negative pressure (designated "−P" in FIG. 6B) in the bottom pipe 404B to collect gasses—both contaminated and from chamber B—thereinto.

It is also noted that the prior referenced J-fins may be employed in the aforementioned decontamination unit 62 to achieve similar goals, including by adding or configuring these surface augmenting features to the flow baffles and meandering pathways of the UV Light Reactor for Contaminated Fluids from applicant's co-pending U.S. patent application Ser. No. 15/924,255 and Canadian patent application 2,961,429. In one preferred embodiment, the aforementioned rosette pattern of J-fins 412 shown in FIG. 6C, in the same arrangement shown in either the top or bottom pipes 404A, 404B, is utilized in the decontamination unit 62. An energy source, such as UV lamp, may be suitably located centrally along the length of the core 414 to augment the decontaminating effect of the chosen decontaminating agent, such as a photocatalytic reactant. All surfaces of each J-fin in the rosette are intended to be coated with a desired decontaminating agent, greatly enhancing the decontaminating effect of the decontamination unit over any prior art units, whether used with or without an energy source.

Figure 6A:
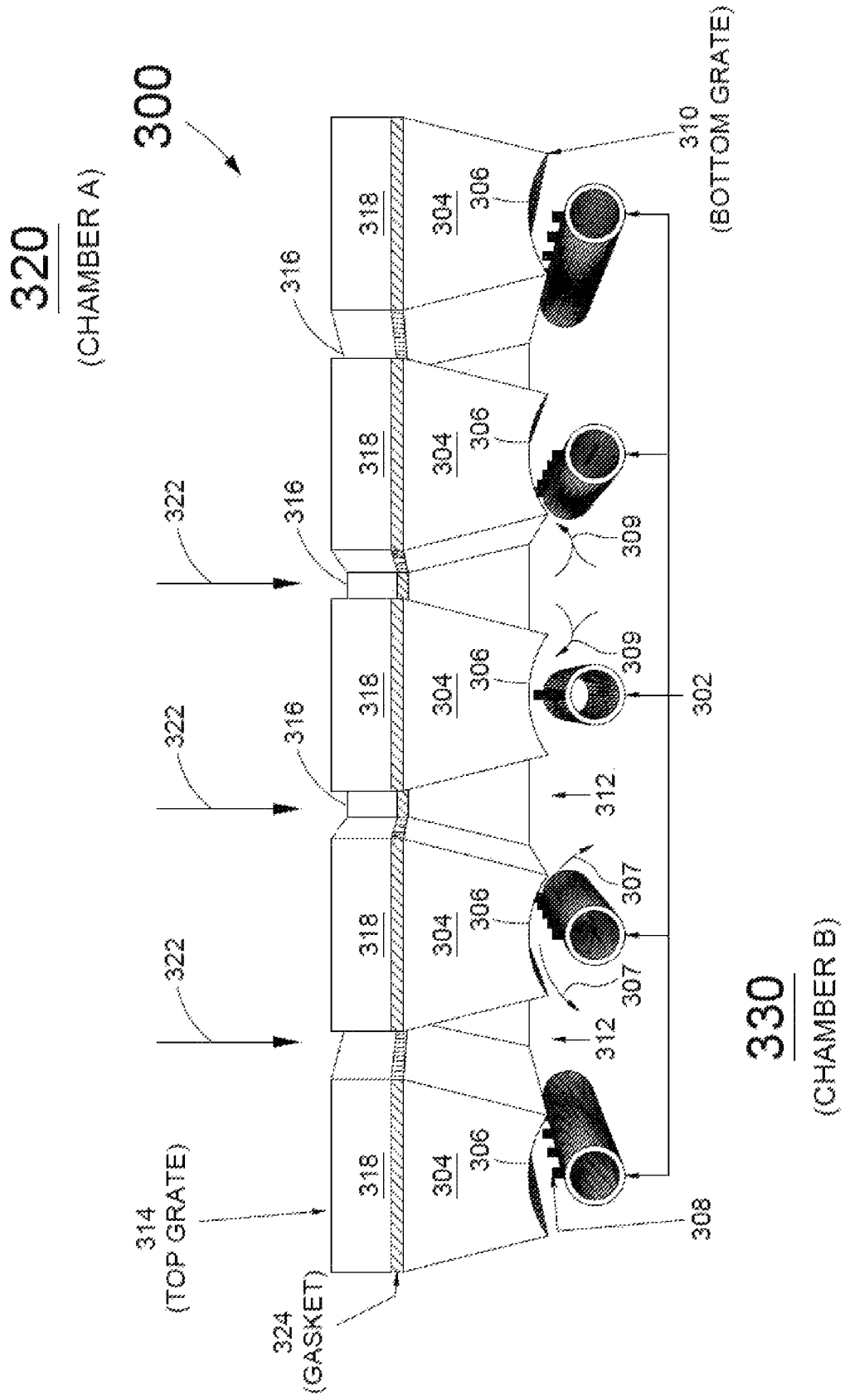
FIG. 6A is a view similar to FIG. 5 showing a first version of a flow element with externally located air passages.
Figure 6B:
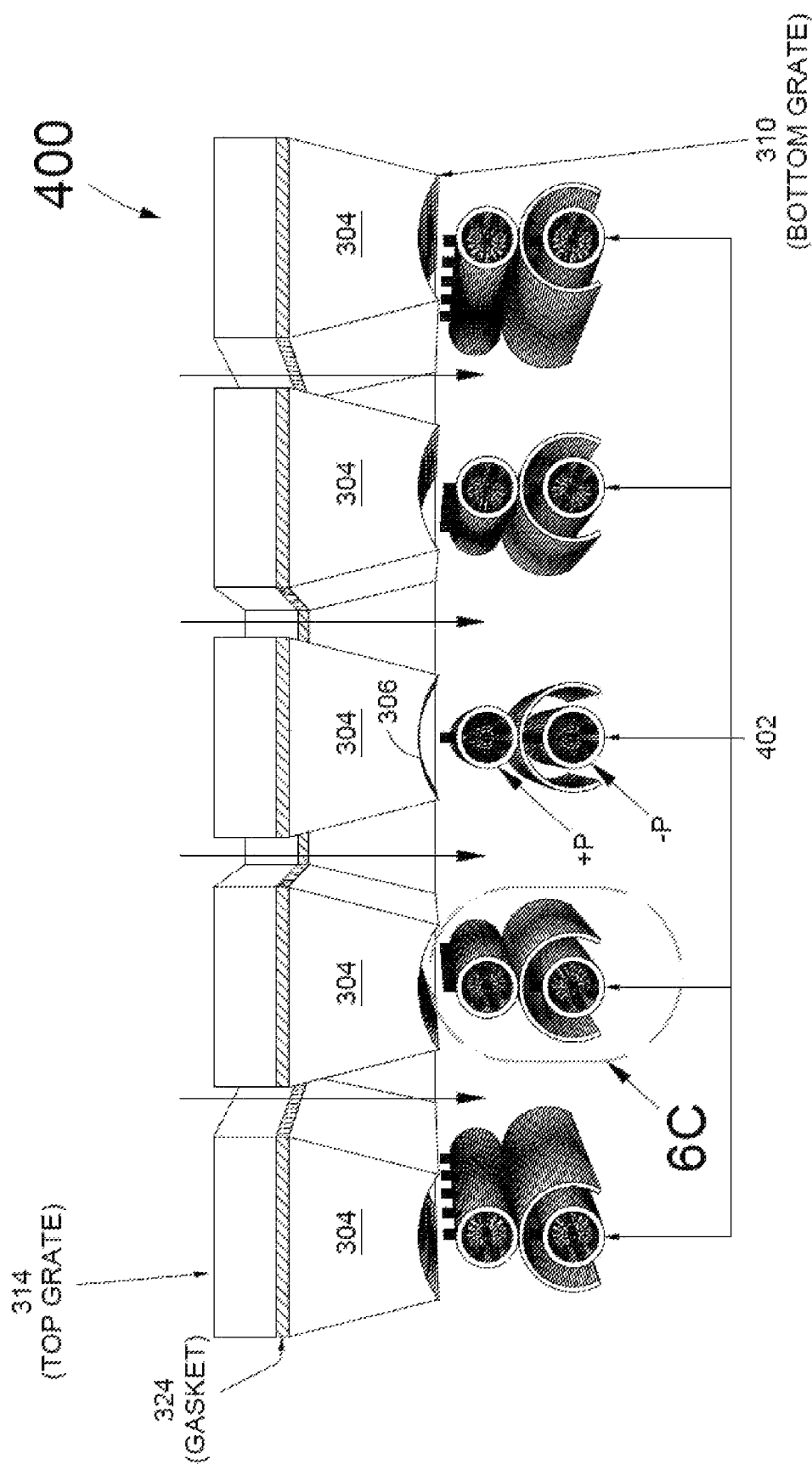
FIG. 6B is a view similar to FIG. 6A showing a second version of a flow element with externally located air passages.
Figure 6D:
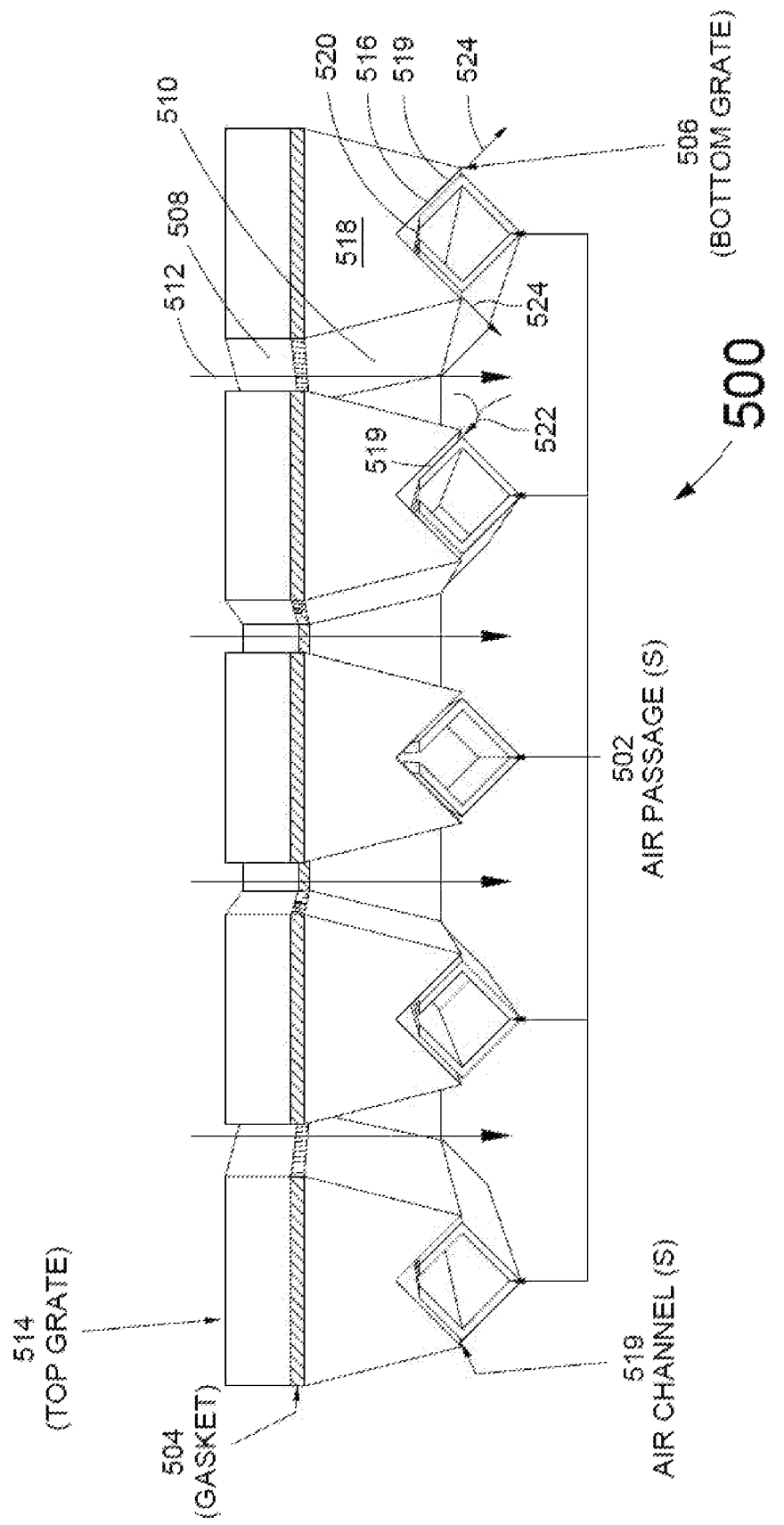
FIG. 6C is a close-up view of one set or air passages in the circled portion of FIG. 6B indicated by reference numeral 6C; and, FIG. 6D is a view similar to FIG. 6A showing a third version of a flow element with externally located air passages.

In a third version of an externally configured flow element 500 illustrated in FIG. 6D, the top grate 514, gasket 504 and bottom grate 506 are shaped and stacked in a manner similar to the first two version in FIGS. 6A & 6B to create like slots 508 and conduits 510 vertically aligned to accommodate the flow of contaminated matter 512 therethrough. However, the air passages 502 take yet another functional shape, namely hollow square, or similar sections, oriented diagonally and spaced below a complimentary triangular shaped bottom surface 516 of each bottom grate rib 518 to form a narrow channel 519 therebetween. The top corner 520 of each hollow section 502 is open to permit gases to flow into and out of the hollow section in negative and positive pressure scenarios, respectively. In a negative pressure scenario gases are drawn into the channel 519 from the adjacent conduit 510 and the chamber B below, as indicated by arrows 522, and travel through the open top 520 into the hollow section, where the internal walls are coated with a decontaminating agent to treat the drawn gases. In the reverse positive pressure scenario gases are expelled from the hollow section 514 into the channels 519 which discharge the gases at an angle toward an adjacent conduit 510 and downwardly toward the chamber B as indicated by the arrows 524, to create the desired suction effect and drawing of contaminated matter from the chamber A through the top grate slots 508. Advantages of this version include the easy and inexpensive creation of the air passages 502 by merely cutting off one corner of a common hollow section, and the effective shielding of the air passages from ingesting contaminated liquids and solids falling through the conduits 510 due to the narrow and steep channels 519.

Amongst the many advantages of the present invention already presented above, an important aspect is the destructive effect of the decontaminating coating, specifically $TiO_2$, as provided within the labyrinth of air passages in the flow element, and without the use of an additional energy source such as UVC light. This arrangement of air passages provides vastly increased surface area exposure of contaminated gas to the decontaminating coating, to achieve a much sought after result of significant destruction of harmful chemicals in noxious or toxic gases, to improve confined space air quality, on each side (chambers A and B) of the flow elements, and for venting to atmosphere. Laboratory testing on the following harmful chemicals, without using UVC light, achieved destruction efficiencies averaging 53.8% for Hydrogen Sulfide, 99.8% for Ammonia, 99.9% for Sulfur Dioxide and 42.0% for Nitrogen Oxides by breaking their molecular bonds and resulting in benign substances.

The above description is intended in an illustrative rather than a restrictive sense, and variations to the specific configurations described may be apparent to skilled persons in adapting the present invention to other specific applications. Further, the scope of the claims below should not be limited by the preferred embodiments set forth herein, but should be given the broadest interpretation consistent with the above description as a whole.

We claim:

1. A process of capturing and mitigating contaminants comprising:
providing a flow element intermediate a first space and a second space, said first space having contaminated matter with at least some contaminated gas;
drawing said contaminated matter from said first space into said flow element;
segregating at least a portion of said contaminated gas away from said contaminated matter while the contaminated matter is in the flow element, resulting in segregated contaminated gas entering passages of the flow element without having first entered the second space and residual contaminated matter entering the second space;
collecting said residual contaminated matter in said second space for further processing;

merging said segregated contaminated gas with gas from said second space to form a mixed gas;

treating contaminants in said mixed gas to form a primary treated gas; and, directing at least some of said primary treated gas to generate at least some of said drawing of contaminated matter from said first space into said flow element.

2. A process of capturing and mitigating contaminants comprising:

providing a flow element intermediate a first space and a second space, said first space having contaminated matter with at least some contaminated gas;

drawing said contaminated matter from said first space into said flow element;

segregating at least a portion of said contaminated gas away from said contaminated matter resulting in segregated contaminated gas and residual contaminated matter;

collecting said residual contaminated matter in said second space for further processing;

merging said segregated contaminated gas with gas from said second space to form a mixed gas;

treating contaminants in said mixed gas to form a primary treated gas; and, directing said primary treated gas to generate at least some of said drawing of contaminated matter from said first space into said flow element, wherein said treating comprises passing said mixed gas through a plurality of passages in said flow element coated with a decontaminating agent to create said primary treated gas.

3. The process of claim 2 wherein said directing comprises channeling said primary treated gas to at least one outlet in said flow element creating a suction effect within said flow element to contribute to said drawing of contaminated matter from said first space into said flow element.

4. The process of claim 3 wherein said channeling comprising locating a fan unit downstream of said plurality of passages for urging said primary treated gas to exit said flow element through said at least one outlet in said flow element.

5. The process of claim 4 wherein at least some of said primary treated gas exiting said flow element is discharged to one or more of the ambient, said first space and said second space.

6. The process of claim 1, 2, 3, 4 or 5 wherein said second space is provided with at least one one-way inlet for permitting ambient air and/or primary treated gas therein.

7. The process of claim 2 wherein said decontaminating agent comprises a photocatalytic coating capable of destroying at least some toxins in said contaminated gas.

8. The process of claim 7 wherein said photocatalytic coating comprises Titanium Dioxide (TiO2).

9. The process of claim 3 further comprising providing said flow element with a grated surface having a plurality of openings adjacent said first space to allow said suction effect to draw said contaminated matter into a plurality of conduits communicating with said second space.

10. The process of claim 9 comprising fortifying said grated surface to support dynamic loading thereon, and incorporates suitably sized openings for said loading.

11. The process of claim 9 wherein said grated surface is removable from said flow element to access at least one of said plurality of passages for maintenance and cleaning.

12. The process of claim 2 wherein said treating comprises passing said mixed gas from said second space through a decontamination unit to create said primary treated gas.

13. A process of capturing and mitigating contaminants comprising:

providing a flow element intermediate a first space and a second space, said first space having contaminated matter with at least some contaminated gas;

drawing said contaminated matter from said first space into said flow element;

segregating at least a portion of said contaminated gas away from said contaminated matter resulting in segregated contaminated gas and residual contaminated matter;

collecting said residual contaminated matter in said second space for further processing;

merging said segregated contaminated gas with gas from said second space to form a mixed gas;

treating contaminants in said mixed gas to form a primary treated gas;

directing said primary treated gas to generate at least some of said drawing of contaminated matter from said first space into said flow element; and, providing a decontamination unit for receiving and further treating said primary treated gas to form a secondary treated gas.

14. The process of claim 13 comprising passing said secondary treated gas from said decontamination unit to said second space.

15. The process of claim 13 comprising locating a fan unit downstream of said decontamination unit for urging said secondary treated gas from said decontamination unit toward said second space and drawing said primary treated gas from said flow element through said decontamination unit.

16. The process of claim 13 comprising locating a relief device downstream of said decontamination unit for optionally diverting at least a portion of said secondary treated gas to at least one of the ambient and said first space.

17. The process of claim 15 comprising locating a relief device downstream of said fan unit for diverting a portion of said secondary treated gas to at least one of the ambient and said first space.

18. The process of claim 13 comprising locating a particulate filter for said primary treated gas upstream of said decontamination unit.

19. The process of claim 13 comprising:

positioning an inlet of a piping system to communicate with said at least one outlet of said flow element for receiving said primary treated gas thereinto;

venting said piping system to flow said secondary treated gas into said second space to co-mingle with other gases therein; and, configuring said flow element for accepting and directing said co-mingled gases from said second space thereinto to form said mixed gas by said suction effect.

20. The process of claim 13 further comprising locating at least one fin in said decontamination unit, and coating said at least one fin with said decontaminating agent to enhance said treating of contaminants.

21. The process of claim 20 wherein said at least one fin is J-shaped.

22. A process of capturing and mitigating contaminants comprising:

providing a flow element intermediate a first space and a second space, said first space having contaminated matter with at least some contaminated gas;

drawing said contaminated matter from said first space into said flow element;

segregating at least a portion of said contaminated gas away from said contaminated matter resulting in segregated contaminated gas and residual contaminated matter;

collecting said residual contaminated matter in said second space for further processing;

merging said segregated contaminated gas with gas from said second space to form a mixed gas;

treating contaminants in said mixed gas to form a primary treated gas; and, directing said primary treated gas to generate at least some of said drawing of contaminated matter from said first space into said flow element, wherein said treating comprises passing said mixed gas from said second space through a decontamination unit to create said primary treated gas, wherein said directing comprises channeling said primary treated gas into and through said flow element creating a suction effect within said flow element to contribute to said drawing of contaminated matter from said first space into said flow element.

23. The process of claim 22 wherein said channeling further comprises flowing said primary treated gas through a plurality of passages in said flow element coated with a decontamination agent for further treating said primary treated gas to form a secondary treated gas.

24. The process of claim 23 wherein said channeling further comprises locating a fan unit upstream of said plurality of passages for urging said primary treated gas thereinto.

25. The process of claim 24 comprising locating a relief device downstream of said fan unit for diverting a portion of said primary treated gas to at least one of the ambient and said first space.

26. The process of claim 22 wherein said channeling further comprises flowing said secondary treated gas to said second space for said forming of mixed gas.

27. The process of claim 26 wherein a particulate matter removal system for said mixed gas is located downstream of said second space for filtering said mixed gas prior to entering said decontamination unit.

28. The process of claim 23 wherein said decontaminating agent comprises a photocatalytic coating capable of destroying at least some toxins in said contaminated gas.

29. The process of claim 28 wherein said photocatalytic coating comprises Titanium Dioxide (TiO2).

30. The process of claim 22 further comprising providing said flow element with a grated surface having a plurality of openings adjacent said first space to allow said suction effect to draw said contaminated matter into a plurality of conduits communicating with said second space.

31. The process of claim 30 comprising fortifying said grated surface to support dynamic loading thereon, and incorporates suitably sized openings for said loading.

32. The process of claim 30 wherein said grated surface is removable from said flow element to access said plurality of passages for maintenance and cleaning.

33. The process of claim 2 or 23 further comprising providing said flow element with a plurality of spaced ribs adjacent said second space, and locating said plurality of passages within at least some of said ribs.

34. The process of claim 2 or 23 further comprising locating at least one fin in said plurality of passages in said flow element, and coating said at least one fin with said decontaminating agent to enhance said treating of contaminants.

35. The process of claim 34 wherein said at least one fin is J-shaped.

36. The process of claim 33 further comprising locating at least one fin in said plurality of passages in said flow element, and coating said at least one fin with said decontaminating agent to enhance said treating of contaminants.

37. The process of claim 2 or 23 further comprising providing said flow element with a plurality of spaced ribs adjacent said second space forming conduits therebetween to allow flow of said contaminated matter from said first space to said second space, and locating said plurality of passages externally of said ribs spaced there below.

38. The process of claim 37 within said plurality of passages are formed of hollow sections coated internally with said decontaminating agent.

39. The process of claim 38 wherein said hollow sections are provided with orifices which are located below suitable shaped bottom surfaces of said ribs for directing gas flow between said orifices and said conduits.

40. The process of claim 39 comprising locating at least one fin in said hollow sections, and coating said at least one fin with said decontaminating agent to enhance said treating of contaminants.

41. The process of claim 40 wherein a plurality of said fins are arranged within said hollow structural sections in a rosette formation.

42. A process of capturing and mitigating contaminants comprising:

providing a flow element intermediate a first space and a second space, said first space having contaminated matter with at least some contaminated gas;

drawing said contaminated matter from said first space into said flow element;

segregating at least a portion of said contaminated gas away from said contaminated matter resulting in segregated contaminated gas and residual contaminated matter;

collecting said residual contaminated matter in said second space for further processing;

merging said segregated contaminated gas with gas from said second space to form a mixed gas;

treating contaminants in said mixed gas to form a primary treated gas, wherein said treating comprises passing said mixed gas from said second space through a decontamination unit to create said primary treated gas;

directing said primary treated gas to generate at least some of said drawing of contaminated matter from said first space into said flow element;

positioning an inlet of a piping system to communicate with said second space to contribute to said merging to form said mixed gas;

positioning said piping system outlet to flow said primary treated gas from said decontamination unit into said flow element; and, configuring said flow element to direct gas inside the flow element to said second space and create a suction effect to draw said contaminated matter from said first space.

43. A process of capturing and mitigating contaminants comprising:

providing a flow element intermediate a first space and a second space, said first space having contaminated matter with at least some contaminated gas;

drawing said contaminated matter from said first space into said flow element;

segregating at least a portion of said contaminated gas away from said contaminated matter resulting in segregated contaminated gas and residual contaminated matter;

collecting said residual contaminated matter in said second space for further processing;

merging said segregated contaminated gas with gas from said second space to form a mixed gas;

treating contaminants in said mixed gas to form a primary treated gas, wherein said treating comprises passing said mixed gas from said second space through a decontamination unit to create said primary treated gas;

directing said primary treated gas to generate at least some of said drawing of contaminated matter from said first space into said flow element; and locating at least one fin in said decontamination unit, and coating said at least one fin with a decontaminating agent to enhance said treating of contaminants.

44. A system for capturing and mitigating contaminants from a first space, the system comprising:

a chamber providing a second space;

a flow element intermediate the first space and the second space, the flow element comprising first openings, air passages, flow conduits, second openings, and third openings, wherein the flow element is configured to permit at least some contaminated matter in the first space to enter the flow element through the first openings and pass through the flow conduits to exit the third openings to reach the second space, wherein the second openings fluidically connect the air passages with the flow conduits, wherein the first openings, second openings, and third openings are different from one another;

a decontamination agent and/or decontamination unit for treating contaminants; and, a fan configured to create a suction effect at the first openings by creating a positive pressure which causes air flow from the air passages into the flow conduits or a negative pressure which causes air flow from the flow conduits into the air passages, wherein the flow element, chamber, and fan are arranged such that when the fan is operating, (i) the at least some contaminated matter is segregated into a portion of contaminated gas and residual contaminated matter, (ii) the segregated contaminated gas is merged with gas from the second space to form a mixed gas, and (iii) at least some of the mixed gas is moved through the air passages of the flow element and subjected to the decontamination agent and/or the decontamination unit to form a treated gas, and wherein the chamber is configured for collecting the residual contaminated matter for further processing.

45. The system of claim 44, wherein the system is characterized by one or more of the following:

the air passages are coated with the decontamination agent;

the at least some of the mixed gas is first treated in the air passages of the flow element to form the treated gas then further treated by the decontamination unit;

the treated gas is channeled into and through the flow element creating a suction effect within the flow element to contribute to drawing of the contaminated matter from the first space into the flow element;

the mixed gas is passed through the decontamination unit to create the treated gas, the system further comprises a piping system with an inlet and an outlet, wherein the inlet is positioned to communicate with the second space to contribute to merging of the segregated contaminated gas with the gas from the second space to form the mixed gas, wherein the outlet is positioned to flow the treated gas from the decontamination unit into the flow element, wherein the flow element is configured to direct gas inside the flow element to the second space and create the suction effect to draw the at least some contaminated matter from the first space;

the mixed gas is passed through the decontamination unit to create the treated gas and the system further comprises at least one fin in the decontamination unit coated with the decontaminating agent;

the system is configured to recirculate some or all of the treated gas to the first space and/or the second space;

the system is configured to direct at least some of said treated gas into the flow element to generate at least some drawing of the at least some contaminated matter from the first space into the flow element; and the system is configured to direct at least some of the treated gas from passages of the flow element toward the second space to generate the suction effect for at least some drawing of the at least some contaminated matter from the first space into the flow element.

46. A process of capturing and mitigating contaminants comprising:

providing a flow element intermediate a first space and a second space, said first space having contaminated matter with at least some contaminated gas;

drawing said contaminated matter from said first space into said flow element;

segregating at least a portion of said contaminated gas away from said contaminated matter resulting in segregated contaminated gas and residual contaminated matter;

collecting said residual contaminated matter in said second space for further processing;

merging said segregated contaminated gas with gas from said second space to form a mixed gas;

treating contaminants in said mixed gas to form a primary treated gas;

directing said primary treated gas to generate at least some of said drawing of contaminated matter from said first space into said flow element; and, recirculating some or all of the primary treated gas to the first space and/or the second space.

47. A process of capturing and mitigating contaminants comprising:

providing a flow element intermediate a first space and a second space, said first space having contaminated matter with at least some contaminated gas and non-gaseous waste;

causing said contaminated matter from said first space to enter into said flow element;

collecting said non-gaseous waste in said second space for further processing;

merging the at least some contaminated gas with gas from said second space to form a mixed gas;

treating contaminants in said mixed gas to form a primary treated gas; and, directing at least some of said primary treated gas into one or more of the flow element and the first space to generate a positive pressure that contributes at least some to said step of causing the contaminated matter from said first space to enter into said flow element.

48. A process of capturing and mitigating contaminants comprising:

providing a flow element intermediate a first space and a second space, said first space having contaminated matter with at least some contaminated gas;

drawing said contaminated matter from said first space into said flow element;

segregating at least a portion of said contaminated gas away from said contaminated matter resulting in segregated contaminated gas and residual contaminated matter;

collecting said residual contaminated matter in said second space for further processing;

merging said segregated contaminated gas with gas from said second space to form a mixed gas;

treating contaminants in said mixed gas to form a primary treated gas; and, directing at least some of said primary treated gas from passages of the flow element toward the second space to generate a suction effect for at least some of said drawing of contaminated matter from said first space into said flow element.

* * * * *